United States Patent
Subhashchandra et al.

(10) Patent No.: US 11,868,747 B2
(45) Date of Patent: Jan. 9, 2024

(54) SYSTEM AND METHOD FOR DYNAMIC DEAD CODE ANALYSIS

(71) Applicant: JPMorgan Chase Bank, N.A., New York, NY (US)

(72) Inventors: Sushma Subhashchandra, Glasgow (GB); Siddhartha Yashwanth, Glasgow (GB)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

(21) Appl. No.: 17/880,388

(22) Filed: Aug. 3, 2022

(65) Prior Publication Data

US 2023/0078729 A1 Mar. 16, 2023

Related U.S. Application Data (60) Provisional application No. 63/261,174, filed on Sep. 14, 2021.

(51) Int. Cl.
*G06F 8/41* (2018.01)
(52) U.S. Cl.
CPC ................. *G06F 8/4435* (2013.01)
(58) Field of Classification Search
None
See application file for complete search history.

(56) References Cited

U.S. PATENT DOCUMENTS

| | | | |
|---|---|---|---|
| 6,470,494 B1* | 10/2002 | Chan | G06F 9/445 717/139 |
| 2003/0204838 A1* | 10/2003 | Caspole | G06F 11/362 714/E11.21 |
| 2014/0109045 A1* | 4/2014 | Kew | G06F 9/455 718/1 |
| 2017/0344350 A1* | 11/2017 | Kalogeropulos | G06F 8/427 |

OTHER PUBLICATIONS

Würthinger et al. "Safe and Atomic Run-time Code Evolution for Java and its Application to Dynamic AOP", OOPSLA'11, Oct. 22-27, 2011, Portland, Oregon, USA. Copyright © 2011 ACM 978-1-4503-0940-0/11/10. (Year: 2011).*

* cited by examiner

*Primary Examiner* — Marina Lee
(74) *Attorney, Agent, or Firm* — GREENBLUM & BERNSTEIN, P.L.C.

(57) ABSTRACT

Various methods, apparatuses/systems, and media for dynamic code analysis using aspect oriented programming (AOP) are disclosed. A processor (i) creates a list of all method names associated with an application before launching the application and writes into a file; (ii) at runtime, reads the method names from the file into a hash set and using AOP load time weaving, each time a method is invoked, pointcut around the execution of the method to remove method name from the hash set in memory; (iii) periodically overwrites the file with a dump of current entries in the hash set for fault tolerance; (iv) for every subsequent restart of the application, the processor repeats from processes (ii) and (Continued)

(iii). After running processes (i)-(iv) for a predetermined time period (a month, a quarter etc.), the processor creates a final with methods that have not been invoked for potential deletion.

20 Claims, 7 Drawing Sheets

SYSTEM AND METHOD FOR DYNAMIC DEAD CODE ANALYSIS

CROSS-REFERENCE TO RELATED APPLICATIONS

This application claims the benefit of priority from U.S. Provisional Patent Application No. 63/261,174, filed Sep. 14, 2021, which is herein incorporated by reference in its entirety.

TECHNICAL FIELD

This disclosure generally relates to code analysis, and, more particularly, to methods and apparatuses for implementing a language agnostic dynamic dead code analysis module that identifies unused code dynamically at runtime.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Applications typically require infrastructure resources such as servers, databases, load balancers, message queues, storages etc. as well updated code in order to function properly and in an efficient manner. Typically, these infrastructure resources need to be provided at the time of application startup as well as during runtime. Modern applications may need to access a number of infrastructure resources and codes in order to provide useful functionality.

For example, there may be several legacy applications in an organization such as JPMorgan and Chase, which may include old, unreachable (dead) code making the code base massive and hard to manage. The existence of dead code may result in a lot of challenges, e.g., impacting maintainability which in turn costs time and money; increasing complexity of the application; slowing down the builds, impacting productivity of the team; affecting test coverage, i.e., if the old legacy code does not have proper tests, then a lot of effort is required to add tests to improve coverage; making it harder to learn a project for a new user/developer due to the presence of these additional unused codes; making it harder to refactor or optimize the program; and making debugging for issues harder as one has to sift through all the superfluous code to find the relevant bits, etc.

In today's market, there appears to be two kinds of conventional tools available that may deal with identifying dead code—static and dynamic analysis tools. Static tools may analyze code during compile time. However, such static tools may have their own shortcomings, e.g., if there is code that is reachable but never actually invoked, these tools fail to identify them accurately. Dynamic tools may analyze during runtime, hence useful in identifying unreachable code in production or other environments. There are very few dynamic tools in the market, but they are not plug-and-play, thereby requiring to make many changes in the code to be able to use them.

Thus, there is a need for an advanced tool that can solve these code analysis issues associated with conventional static and dynamic tools.

SUMMARY

The present disclosure, through one or more of its various aspects, embodiments, and/or specific features or sub-components, provides, among other features, various systems, servers, devices, methods, media, programs, and platforms for implementing a language agnostic dynamic dead code analysis module that identifies unused code dynamically at runtime and that can be injected into any existing code requiring little to no changes to the codebase itself.

According to an aspect of the present disclosure, a method for dynamic code analysis by utilizing one or more processors and one or more memories is disclosed. The method may include: creating a list of all method names associated with an application before launching the application; storing the list of all method names onto a file in a predefined file format before launching the application; at runtime of the application, loading the method names from the file onto a hash set and storing the hash set onto a memory; for each method that is being invoked during the runtime of the application, implementing a pointcut process around execution of the method; and removing, in response to the pointcut process, the method name associated with the method that is being invoked during the runtime of the application from the hash set stored onto the memory.

According to yet another aspect of the instant disclosure, the list of all method names may include entire code base of the application.

According to a further aspect of the instant disclosure, in implementing the pointcut process around execution of the method, the method may further include implementing aspect oriented programming (AOP) to create a dynamic code analysis tool and implementing AOP load-time weaving process, where weaving is the process of linking aspects with other outsider application types or objects to create an advised object, but the disclosure is not limited thereto.

According to an additional aspect of the instant disclosure, the file may be a text file and the predefined file format may include any one of the following file formats: .txt, .doc, .lst, etc., but the disclosure is not limited thereto.

According to yet another aspect of the instant disclosure, the method may further include: overwriting the text file with a dump of current entries in the hash set in a periodic manner for fault tolerance; and creating a new file with updated entries in the hash set, wherein the new file includes a subset of all method names excluding the method names removed by the pointcut process.

According to yet another aspect of the instant disclosure, for every subsequent restart of the application, the method may further include: (i) loading the method names from the new file onto the hash set and storing onto the memory; (ii) for each method that is being invoked during the subsequent runtime of the application, implementing the pointcut process around execution of the method; (iii) removing, in response to the pointcut process, the method name associated with the method that is being invoked during the subsequent runtime of the application from the hash set stored onto the memory; and (iv) dynamically updating the new file so that the new file does not include the method name that is being removed during the subsequent runtime of the application.

According to a further aspect of the instant disclosure, after running processes (i)-(iv) for a predetermined period of time, the method may further include: creating a final list of method names in the new file that includes only the methods that have not been invoked at the restart of the application during the predetermined period of time; and deleting the methods that have not been invoked at the restart of the application during the predetermined period of time.

According to another aspect of the instant disclosure, a system for dynamic code analysis is disclosed. The system may include: a processor; and a memory operatively connected to the processor via a communication interface, the memory storing computer readable instructions, when executed, may cause the processor to: create a list of all method names associated with an application before launching the application; store the list of all method names onto a file in a predefined file format before launching the application; at runtime of the application, loading the method names from the file onto a hash set and store the hash set onto the memory; for each method that is being invoked during the runtime of the application, implement a pointcut process around execution of the method; and remove, in response to the pointcut process, the method name associated with the method that is being invoked during the runtime of the application from the hash set stored onto the memory.

According to a further aspect of the instant disclosure, in implementing the pointcut process around execution of the method, the processor may be further configured to implement AOP to create a dynamic code analysis tool and implement AOP load-time weaving process, where weaving is the process of linking aspects with other outsider application types or objects to create an advised object, but the disclosure is not limited thereto.

According to an additional aspect of the instant disclosure, the processor may be further configured to: overwrite the text file with a dump of current entries in the hash set in a periodic manner for fault tolerance; and create a new file with updated entries in the hash set, wherein the new file includes a subset of all method names excluding the method names removed by the pointcut process.

According to yet another aspect of the instant disclosure, for every subsequent restart of the application, the processor may be further configured to: (i) load the method names from the new file onto the hash set and storing onto the memory; (ii) for each method that is being invoked during the subsequent runtime of the application, implement the pointcut process around execution of the method; (iii) remove, in response to the pointcut process, the method name associated with the method that is being invoked during the subsequent runtime of the application from the hash set stored onto the memory; and (iv) dynamically update the new file so that the new file does not include the method name that is being removed during the subsequent runtime of the application.

According to a further aspect of the instant disclosure, after running processes (i)-(iv) for a predetermined period of time, the processor may be further configured to: create a final list of method names in the new file that includes only the methods that have not been invoked at the restart of the application during the predetermined period of time; and delete the methods that have not been invoked at the restart of the application during the predetermined period of time.

According to another aspect of the instant disclosure, a non-transitory computer readable medium configured to store instructions for dynamic code analysis is disclosed. The instructions, when executed, may cause a processor to: create a list of all method names associated with an application before launching the application; store the list of all method names onto a file in a predefined file format before launching the application; at runtime of the application, loading the method names from the file onto a hash set and store the hash set onto the memory; for each method that is being invoked during the runtime of the application, implement a pointcut process around execution of the method; and remove, in response to the pointcut process, the method name associated with the method that is being invoked during the runtime of the application from the hash set stored onto the memory.

According to a further aspect of the instant disclosure, in implementing the pointcut process around execution of the method, the instructions, when executed, may further cause the processor to implement AOP to create a dynamic code analysis tool and implement AOP load-time weaving process, where weaving is the process of linking aspects with other outsider application types or objects to create an advised object, but the disclosure is not limited thereto.

According to an additional aspect of the instant disclosure, the instructions, when executed, may further cause the processor to: overwrite the text file with a dump of current entries in the hash set in a periodic manner for fault tolerance; and create a new file with updated entries in the hash set, wherein the new file includes a subset of all method names excluding the method names removed by the pointcut process.

According to yet another aspect of the instant disclosure, for every subsequent restart of the application, the instructions, when executed, may further cause the processor to: (i) load the method names from the new file onto the hash set and storing onto the memory; (ii) for each method that is being invoked during the subsequent runtime of the application, implement the pointcut process around execution of the method; (iii) remove, in response to the pointcut process, the method name associated with the method that is being invoked during the subsequent runtime of the application from the hash set stored onto the memory; and (iv) dynamically update the new file so that the new file does not include the method name that is being removed during the subsequent runtime of the application.

According to a further aspect of the instant disclosure, after running processes (i)-(iv) for a predetermined period of time, the instructions, when executed, may further cause the processor to: create a final list of method names in the new file that includes only the methods that have not been invoked at the restart of the application during the predetermined period of time; and delete the methods that have not been invoked at the restart of the application during the predetermined period of time.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
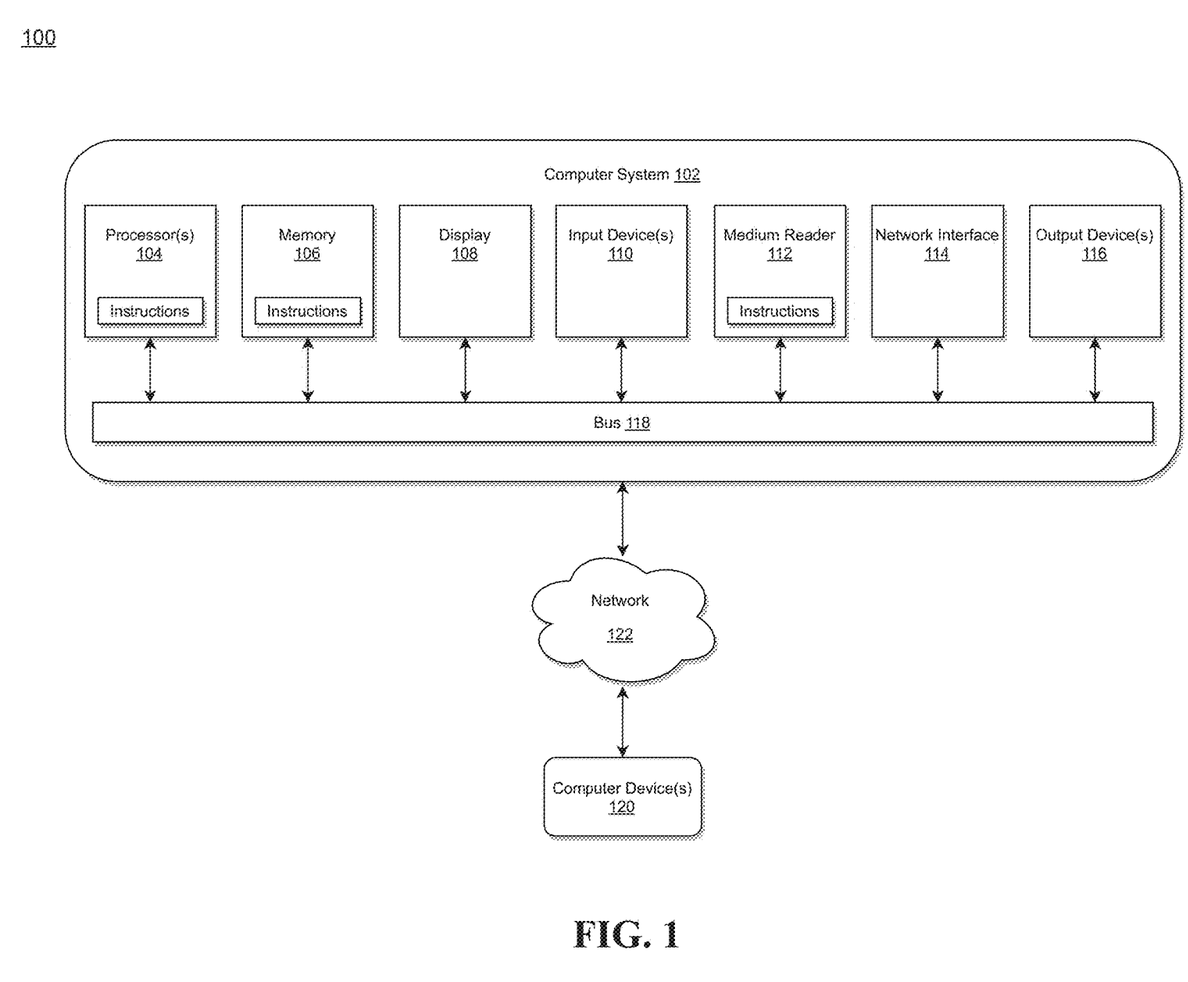
FIG. 1 illustrates a computer system for implementing a language agnostic dynamic dead code analysis module for dynamically identifying dead code and removing the dead code in accordance with an exemplary embodiment.

FIG. 1 is an exemplary system for use in implementing a language agnostic dynamic dead code analysis module for dynamically identifying dead code and removing the dead code in accordance with the embodiments described herein, but the disclosure is not limited thereto. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
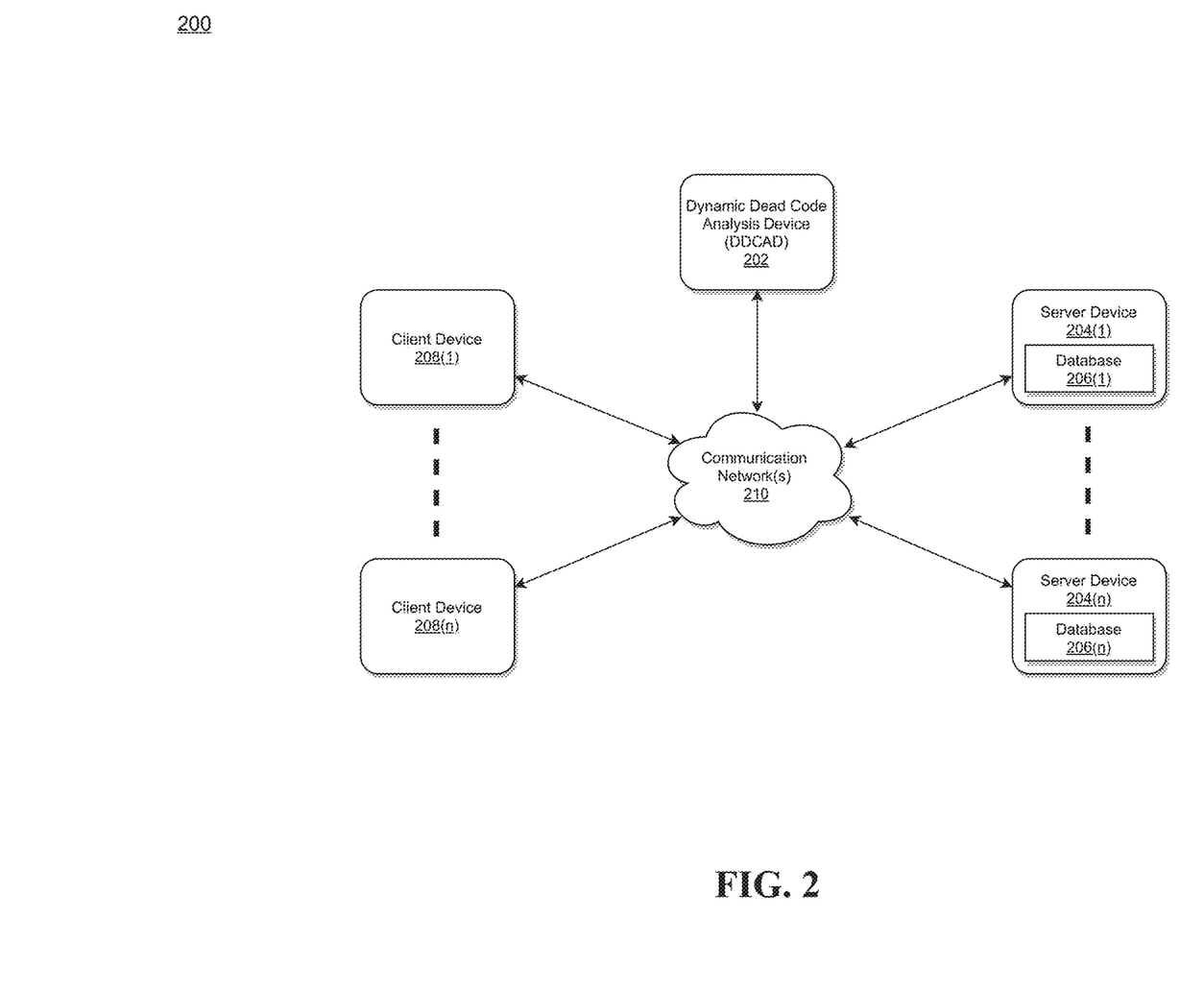
FIG. 2 illustrates an exemplary diagram of a network environment with a dynamic dead code analysis device in accordance with an exemplary embodiment.

Referring to FIG. 2, a schematic of an exemplary network environment 200 for implementing a dynamic dead code analysis device (DDCAD) of the instant disclosure is illustrated.

According to exemplary embodiments, the above-described problems associated with conventional approach of dead code analysis may be overcome by implementing a DDCAD 202 as illustrated in FIG. 2 that may identify unused code dynamically at runtime and that can be injected into any existing code requiring little to no changes to the codebase itself, but the disclosure is not limited thereto.

The DDCAD 202 may be the same or similar to the computer system 102 as described with respect to FIG. 1.

The DDCAD 202 may store one or more applications that can include executable instructions that, when executed by the DDCAD 202, cause the DDCAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DDCAD 202 itself, may be located in virtual server(s) running in a cloud-based computing environment rather than being tied to one or more specific physical network computing devices. Also, the application(s) may be running in one or more virtual machines (VMs) executing on the DDCAD 202. Additionally, in one or more embodiments of this technology, virtual machine(s) running on the DDCAD 202 may be managed or supervised by a hypervisor.

In the network environment 200 of FIG. 2, the DDCAD 202 is coupled to a plurality of server devices 204(1)-204(n) that hosts a plurality of databases 206(1)-206(n), and also to a plurality of client devices 208(1)-208(n) via communication network(s) 210. A communication interface of the DDCAD 202, such as the network interface 114 of the computer system 102 of FIG. 1, operatively couples and communicates between the DDCAD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DDCAD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DDCAD 202 may be a standalone device or integrated with one or more other devices or apparatuses, such as one or more of the server devices 204(1)-204(n), for example. In one particular example, the DDCAD 202 may be hosted by one of the server devices 204(1)-204(n), and other arrangements are also possible. Moreover, one or more of the devices of the DDCAD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DDCAD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the DDCAD 202 that may identify unused code dynamically at runtime and that can be injected into any existing code requiring little to no changes to the codebase itself, but the disclosure is not limited thereto.

The client devices 208(1)-208(n) may run interface applications, such as standard web browsers or standalone client applications, which may provide an interface to communicate with the DDCAD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DDCAD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DDCAD 202, the server devices 204(1)-204(n), or the client devices 208(1)-208(n), for example, may be configured to operate as virtual instances on the same physical machine. For example, one or more of the DDCAD 202, the server devices 204(1)-204(n), or the client devices 208(1)-208(n) may operate on the same physical device rather than as separate devices communicating through communication network(s) 210. Additionally, there may be more or fewer DDCADs 202, server devices 204(1)-204(n), or client devices 208(1)-208(n) than illustrated in FIG. 2. According to exemplary embodiments, the DDCAD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
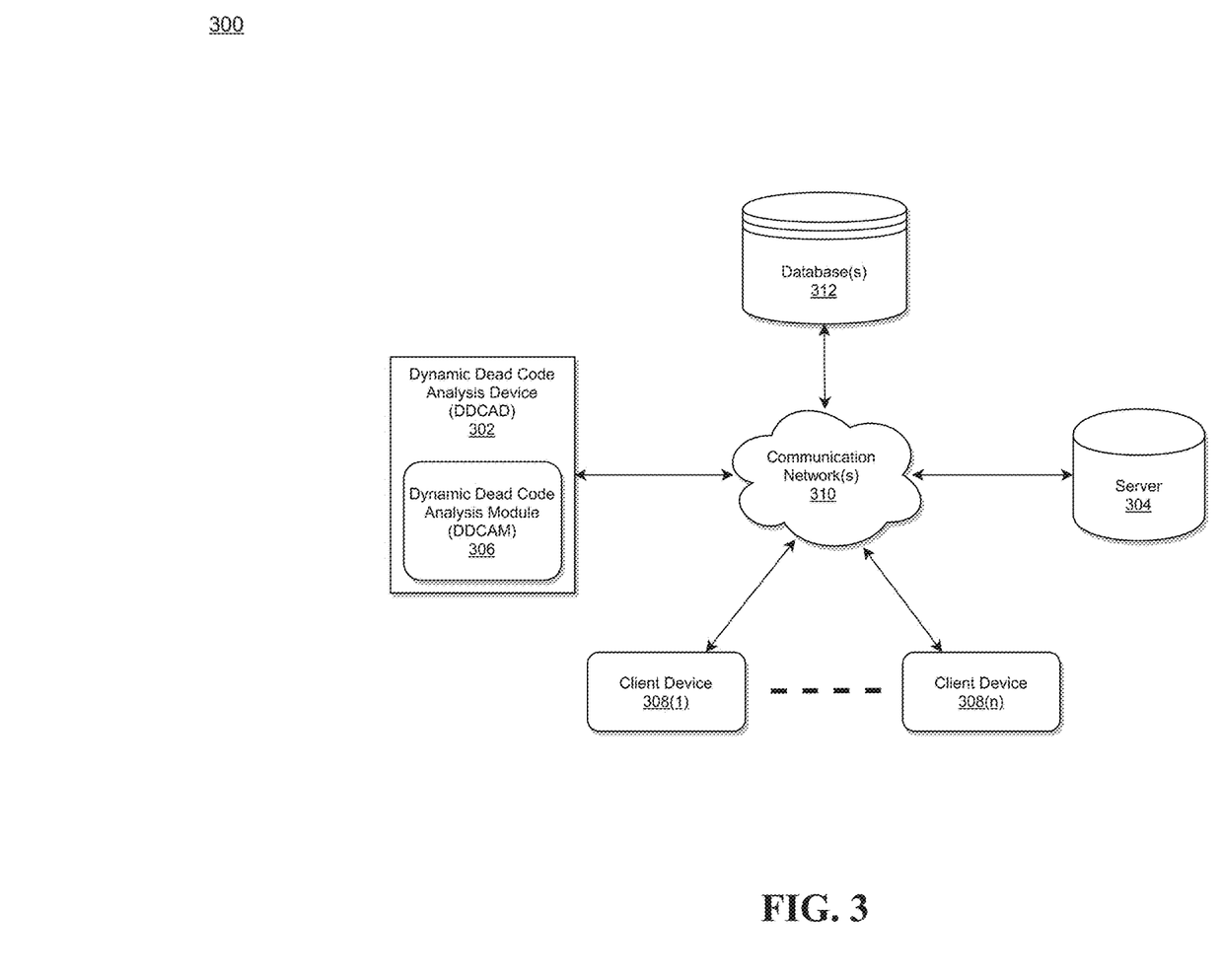
FIG. 3 illustrates a system diagram for implementing a dynamic dead code analysis device having a dynamic dead code analysis module in accordance with an exemplary embodiment.

FIG. 3 illustrates a system diagram for implementing a platform and language agnostic dynamic dead code analysis device (DDCAD) having a platform and language agnostic dynamic dead code analysis module (DDCAM) in accordance with an exemplary embodiment.

As illustrated in FIG. 3, the system 300 may include a DDCAD 302 within which a DDCAM 306 is embedded, a server 304, a database(s) 312, a plurality of client devices 308(1) . . . 308(n), and a communication network 310. The database(s) 312 may be also referred to as a configuration and log database.

According to exemplary embodiments, the DDCAD 302 including the DDCAM 306 may be connected to the server 304, and the database(s) 312 via the communication network 310. The DDCAD 302 may also be connected to the plurality of client devices 308(1) . . . 308(n) via the communication network 310, but the disclosure is not limited thereto. The client devices 308(1) . . . 308(n) may be the same or similar to the client devices 208(1) . . . 208(n)

According to exemplary embodiment, the DDCAD 302 is described and shown in FIG. 3 as including the DDCAM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein.

According to exemplary embodiments, the DDCAM 306 may be configured to receive real-time feed of data from the plurality of client devices 308(1) . . . 308(n) via the communication network 310.

As will be described below, the DDCAM 306 may be configured to create a list of all method names associated with an application before launching the application; store the list of all method names onto a file in a predefined file format before launching the application; at runtime of the application, loading the method names from the file onto a hash set (method set) and store the hash set onto the memory; for each method that is being invoked during the runtime of the application, implement a pointcut process around execution of the method; and remove, in response to the pointcut process, the method name associated with the method that is being invoked during the runtime of the application from the hash set stored onto the memory, but the disclosure is not limited thereto.

The plurality of client devices 308(1) . . . 308(n) are illustrated as being in communication with the DDCAD 302. In this regard, the plurality of client devices 308(1) . . . 308(n) may be "clients" of the DDCAD 302 and are described herein as such. Nevertheless, it is to be known and understood that the plurality of client devices 308(1) . . . 308(n) need not necessarily be "clients" of the DDCAD 302, or any entity described in association therewith herein. Any additional or alternative relationship may exist between either or both of the plurality of client devices 308(1) . . . 308(n) and the DDCAD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the DDCAD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The DDCAD 302 may be the same or similar to the DDCAD 202 as described with respect to FIG. 2, including any features or combination of features described with respect thereto.

Figure 4:
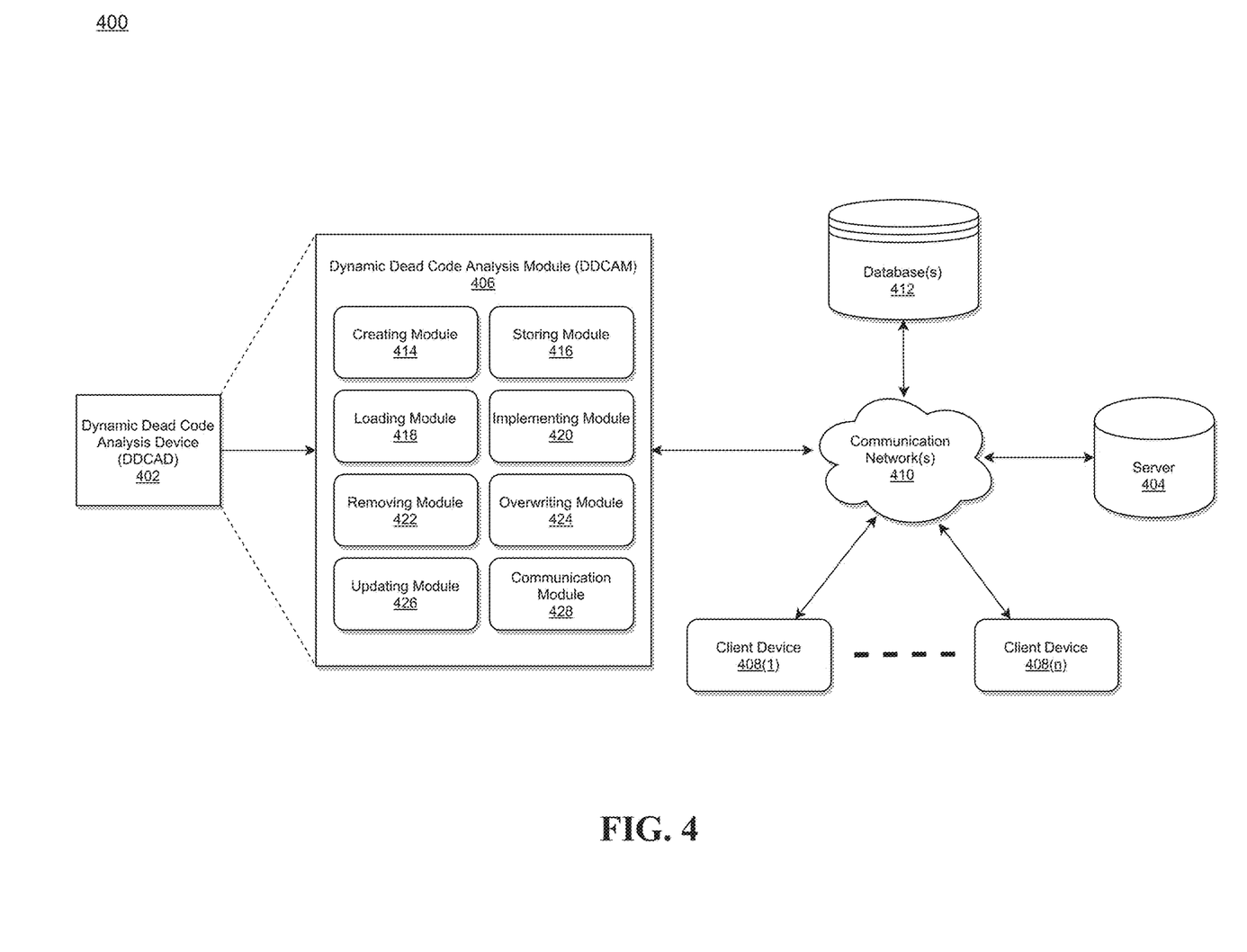
FIG. 4 illustrates a system diagram for implementing a dynamic dead code analysis module of FIG. 3 in accordance with an exemplary embodiment.

FIG. 4 illustrates a system diagram for implementing a platform and language agnostic dynamic dead code analysis module (DDCAM) of FIG. 3 in accordance with an exemplary embodiment.

According to exemplary embodiments, the system 400 may include a platform and language agnostic dynamic dead code analysis device (DDCAD) 402 within which a DDCAM 406 is embedded, a server 404, database(s) 412, and a communication network 410.

According to exemplary embodiments, the DDCAD 402 including the DDCAM 406 may be connected to the server 404 and the database(s) 412 via the communication network 410. The DDCAD 402 may also be connected to the plurality of client devices 408(1)-408(n) via the communication network 410, but the disclosure is not limited thereto. The DDCAM 406, the server 404, the plurality of client devices 408(1)-408(n), the database(s) 412, the communication network 410 as illustrated in FIG. 4 may be the same or similar to the DDCAM 306, the server 304, the plurality of client devices 308(1)-308(n), the database(s) 312, the communication network 310, respectively, as illustrated in FIG. 3.

According to exemplary embodiments, as illustrated in FIG. 4, the DDCAM 406 may include a creating module 414, a storing module 416, a loading module 418, an implementing module 420, a removing module 422, an overwriting module 424, an updating module 426, and a communication module 428.

According to exemplary embodiments, each of the creating module 414, storing module 416, loading module 418, implementing module 420, removing module 422, overwriting module 424, updating module 426, and the communication module 428 of the DDCAM 406 as illustrated in FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the creating module 414, storing module 416, loading module 418, implementing module 420, removing module 422, overwriting module 424, updating module 426, and the communication module 428 of the DDCAM 406 as illustrated in FIG. 4 may be implemented by microprocessors or similar, and may be programmed using software (e.g., microcode) to perform various functions discussed herein and may optionally be driven by firmware and/or software.

Alternatively, according to exemplary embodiments, each of the creating module 414, storing module 416, loading module 418, implementing module 420, removing module 422, overwriting module 424, updating module 426, and the communication module 428 of the DDCAM 406 as illustrated in FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the creating module 414, storing module 416, loading module 418, implementing module 420, removing module 422, overwriting module 424, updating module 426, and the communication module 428 of the DDCAM 406 as illustrated in FIG. 4 may be called via corresponding API.

The process may be executed via the communication module 428 and the communication network 410, which may comprise plural networks as described above. For example, in an exemplary embodiment, the various components of the DDCAM 406 may communicate with the server 404, and the database(s) 412 via the communication module 428 and the communication network 410. Of course, these embodiments are merely exemplary and are not limiting or exhaustive.

According to exemplary embodiments, the communication network 410 and the communication module 428 may be configured to establish a link between the database(s) 412, the client devices 408(1)-408(n) and the DDCAM 406.

Figure 5:
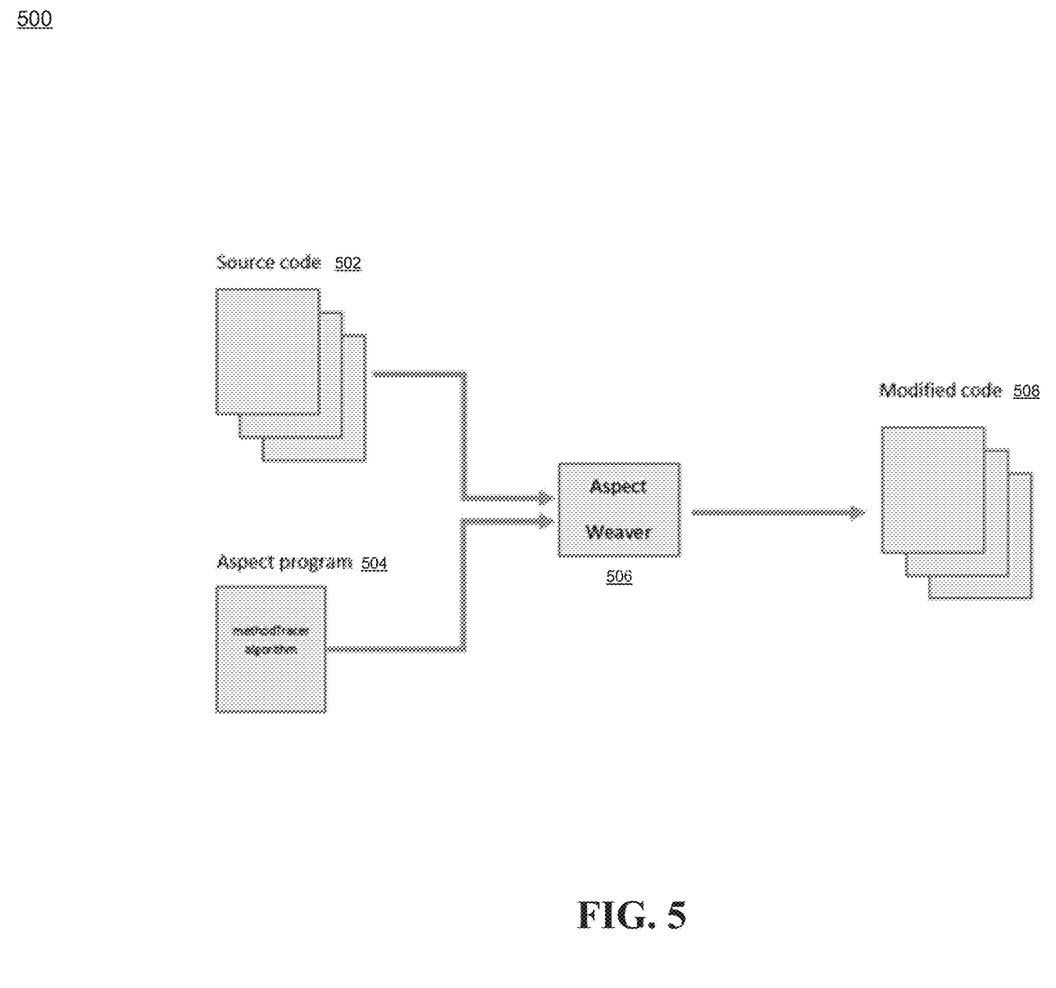
FIG. 5 illustrates an exemplary load-time weaving process implemented by the dynamic dead code analysis module of FIG. 4 in accordance with an exemplary embodiment.

FIG. 5 illustrates an exemplary load-time weaving process 500 implemented by the DDCAM of FIG. 4 in accordance with an exemplary embodiment. The load-time weaving process 500, in accordance with exemplary embodiments, may be an aspect oriented programming (AOP) load-time weaving process implemented by the aspect weaver 506. As illustrated in FIG. 5, in the exemplary load-time weaving process 500, the aspect weaver 506 may receive source code 502 and an aspect program 504 (i.e., method tracer algorithm) and generates a modified code 508.

Figure 6:
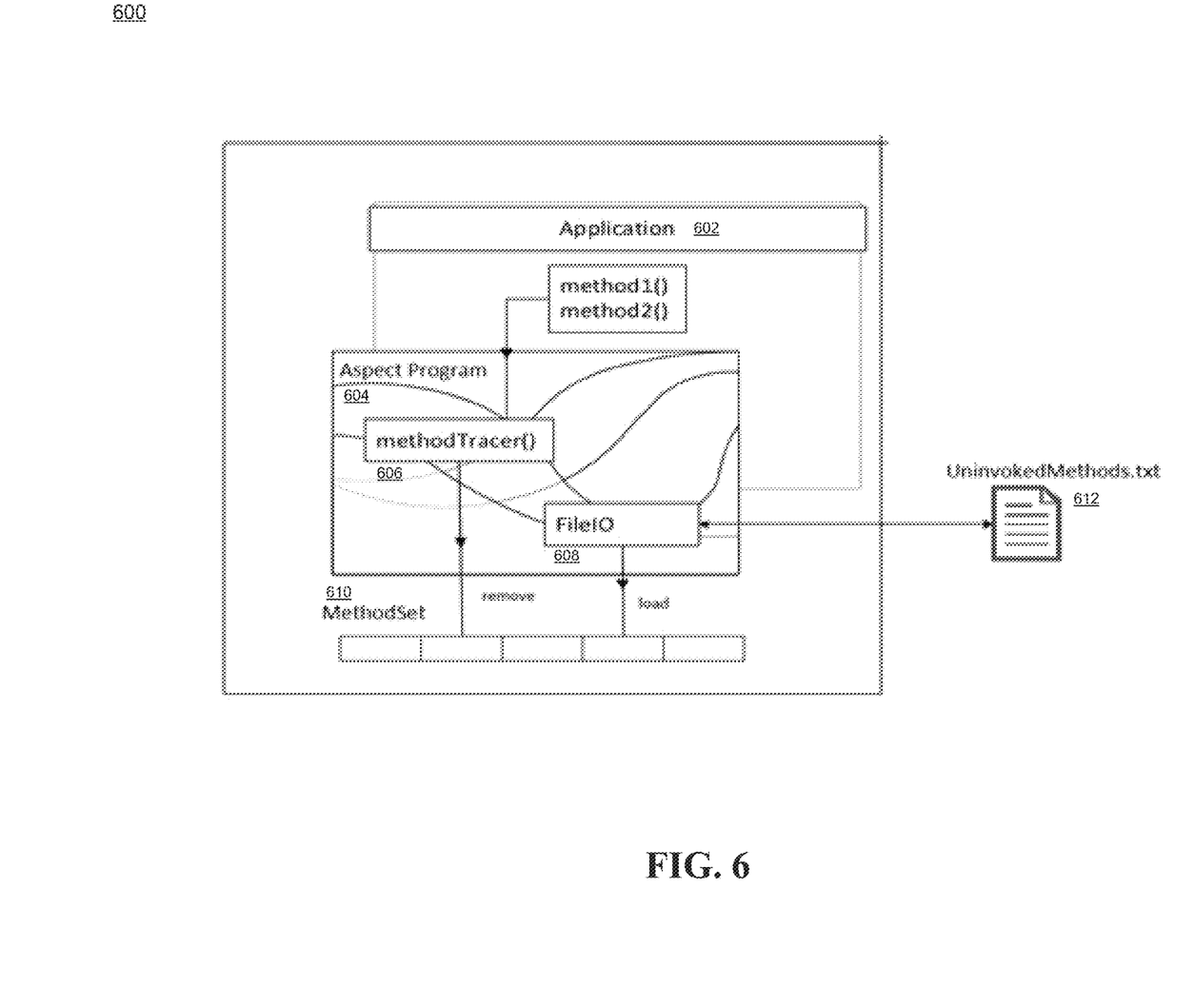
FIG. 6 illustrates an exemplary modified application generated by the dynamic dead code analysis module of FIG. 4 in accordance with an exemplary embodiment

FIG. 6 illustrates an exemplary use case 600 of an application 602 undergoing dynamic dead code analysis by the DDCAM of FIG. 4 in accordance with an exemplary embodiment. As illustrated in FIG. 6, the exemplary use case 600 includes an application 602, an aspect program 604 block, a method tracer 606 block, a file input/output 608 block, a method set 610 block, and a text file 612. According to exemplary embodiments, the text file may include a list of un-invoked methods during runtime of the application 602.

Referring to FIGS. 4-6, according to exemplary embodiments, the creating module 414 may be configured to create a list of all method names associated with the application 602 before launching the application 602.

According to exemplary embodiments, the storing module 416 may be configured to store the list of all method names onto a file 612 in a predefined file format before launching the application 602. According to exemplary embodiments, the list of all method names may include entire code base of the application 602. The file 612 may be a text file and the predefined file format includes any one of the following file formats: .txt, .doc, .lst, but the disclosure is not limited thereto.

At runtime of the application 602, according to exemplary embodiments, the loading module 418 may be configured to load the method names from the file 612 onto a hash set (i.e., method set 610) and store the hash set (i.e., method set 610) onto the memory. For each method that is being invoked during the runtime of the application 602, the implementing module 420 may be configured to implement a pointcut process around execution of the method. According to exemplary embodiments, the removing module 422 may be configured to remove, in response to the pointcut process, the method name associated with the method that is being invoked during the runtime of the application 602 from the hash set (i.e., method set 610) stored onto the memory.

According to exemplary embodiments, in implementing the pointcut process around execution of the method, the implementing module 420 may be configured to implement AOP (i.e., aspect program 504, 604 that can be a method tracer algorithm 606) to create a dynamic code analysis tool and implement AOP load-time weaving process in the aspect weaver 506, where weaving is the process of linking aspects with other outsider application types or objects to create an advised object, but the disclosure is not limited thereto.

According to exemplary embodiments, the overwriting module 424 may be configured to overwrite the text file 612 with a dump of current entries in the hash set (i.e., method set 610) in a periodic manner (i.e., once every hour or few hours, but the disclosure is not limited thereto) for fault tolerance by utilizing data from the file input/output 608 block.

According to exemplary embodiments, the creating module 414 may be configured to create a new file with updated entries in the hash set (i.e., method set 610). The new file may include a subset of all method names excluding the method names removed by the pointcut process.

According to exemplary embodiments, for every subsequent restart of the application, the DDCAM 406 may be further configured to: (i) load the method names from the new file onto the hash set (i.e., method set 610) by utilizing the loading module 418 and storing onto the memory by utilizing the storing module 416; (ii) for each method that is being invoked during the subsequent runtime of the application 602, implement the pointcut process around execution of the method by utilizing the storing module 416; (iii)

remove, in response to the pointcut process, the method name associated with the method that is being invoked during the subsequent runtime of the application 602 from the hash set (i.e., method set 610) stored onto the memory; and (iv) dynamically update the new file so that the new file does not include the method name that is being removed during the subsequent runtime of the application 602.

According to exemplary embodiments, after running processes (i)-(iv) for a predetermined period of time (i.e., a month, a quarter, etc., but the disclosure is not limited thereto), the DDCAM 406 may be further configured to: create a final list of method names in the new file that includes only the methods that have not been invoked at the restart of the application 602 during the predetermined period of time (i.e., a month, a quarter, etc., but the disclosure is not limited thereto) by utilizing the creating module 414; and delete the methods that have not been invoked at the restart of the application 602 during the predetermined period of time (i.e., a month, a quarter, etc., but the disclosure is not limited thereto).

Figure 7:
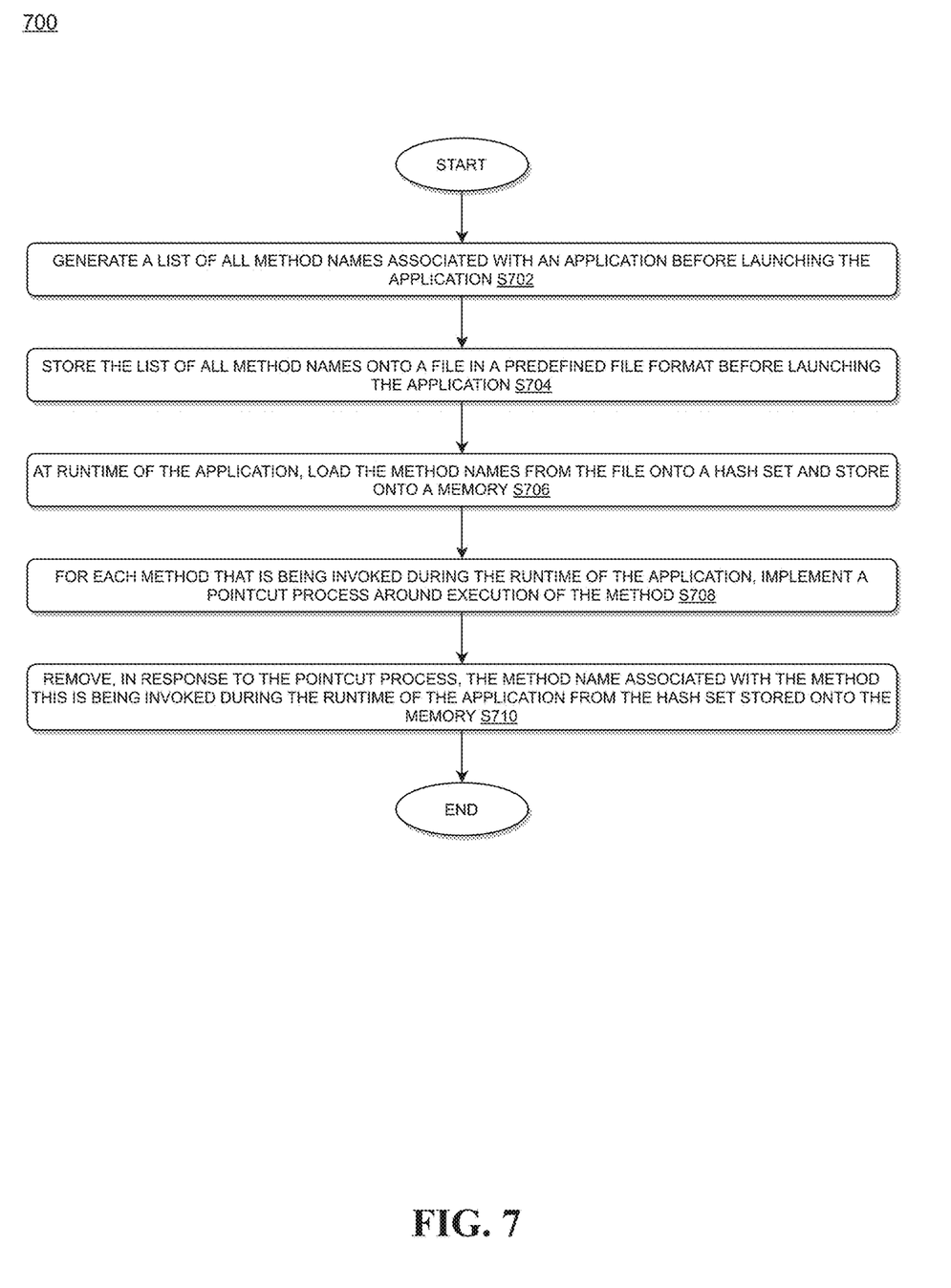
FIG. 7 illustrates a flow chart of a process implemented by the dynamic dead code analysis module of FIG. 4 in accordance with an exemplary embodiment.

FIG. 7 illustrates a flow chart of a process 700 implemented by the DDCAM 406 of FIG. 4 in accordance with an exemplary embodiment. It will be appreciated that the illustrated process 700 and associated steps may be performed in a different order, with illustrated steps omitted, with additional steps added, or with a combination of reordered, combined, omitted, or additional steps.

As illustrated in FIG. 7, at step S702, the process 700 may include creating a list of all method names associated with an application before launching the application.

At step S704, the process 700 may include storing the list of all method names onto a file in a predefined file format before launching the application.

At step S706, the process 700 may include, at runtime of the application, loading the method names from the file onto a hash set and storing the hash set onto a memory.

At step S708, the process 700 may include dynamically creating, based on the retrieved configuration file and logging information data, multiple simultaneous and interactive server sessions among the plurality of child sessions.

At step S710, the process 700 may include, for each method that is being invoked during the runtime of the application, implementing a pointcut process around execution of the method.

According to exemplary embodiments, in implementing the pointcut process around execution of the method, the process 700 may further include implementing aspect oriented programming (AOP) to create a dynamic code analysis tool and implementing AOP load-time weaving process, where weaving is the process of linking aspects with other outsider application types or objects to create an advised object, but the disclosure is not limited thereto.

According to exemplary embodiments, the process 700 may further include overwriting the text file with a dump of current entries in the hash set in a periodic manner for fault tolerance; and creating a new file with updated entries in the hash set, wherein the new file includes a subset of all method names excluding the method names removed by the pointcut process.

According to exemplary embodiments, for every subsequent restart of the application, the process 700 may further include (i) loading the method names from the new file onto the hash set and storing onto the memory; (ii) for each method that is being invoked during the subsequent runtime of the application, implementing the pointcut process around execution of the method; (iii) removing, in response to the pointcut process, the method name associated with the method this is being invoked during the subsequent runtime of the application from the hash set stored onto the memory; and (iv) dynamically updating the new file so that the new file does not include the method name that is being removed during the subsequent runtime of the application.

According to exemplary embodiments, after running processes (i)-(iv) for a predetermined period of time, the process 700 may further include: creating a final list of method names in the new file that includes only the methods that have not been invoked at the restart of the application during the predetermined period of time; and deleting the methods that have not been invoked at the restart of the application during the predetermined period of time.

According to exemplary embodiments, the DDCAD 402 may include a memory (e.g., a memory 106 as illustrated in FIG. 1) which may be a non-transitory computer readable medium that may be configured to store instructions for implementing the DDCAM 406 that may identify unused code dynamically at runtime and that can be injected into any existing code requiring little to no changes to the codebase itself as disclosed herein. The DDCAD 402 may also include a medium reader (e.g., a medium reader 112 as illustrated in FIG. 1) which may be configured to read any one or more sets of instructions, e.g., software, from any of the memories described herein. The instructions, when executed by a processor embedded within the DDCAM 406 or within the DDCAD 402, may be used to perform one or more of the methods and processes as described herein. In a particular embodiment, the instructions may reside completely, or at least partially, within the memory 106, the medium reader 112, and/or the processor 104 (see FIG. 1) during execution by the DDCAD 402.

According to exemplary embodiments, the instructions, when executed, may cause a processor embedded within the DDCAM 406, or the DDCAD 402 to perform the following: creating a list of all method names associated with an application before launching the application; storing the list of all method names onto a file in a predefined file format before launching the application; at runtime of the application, loading the method names from the file onto a hash set and storing the hash set onto a memory; for each method that is being invoked during the runtime of the application, implementing a pointcut process around execution of the method; and removing, in response to the pointcut process, the method name associated with the method this is being invoked during the runtime of the application from the hash set stored onto the memory. The processor may be the same or similar to the processor 104 as illustrated in FIG. 1 or the processor embedded within DDCAD 202, DDCAD 302, DDCAD 402, and the DDCAM 406.

According to exemplary embodiments, in implementing the pointcut process around execution of the method, the instructions, when executed, may further cause the processor 104 to perform the following: implementing aspect oriented programming (AOP) to create a dynamic code analysis tool and implementing AOP load-time weaving process, where weaving is the process of linking aspects with other outsider application types or objects to create an advised object, but the disclosure is not limited thereto.

According to exemplary embodiments, the instructions, when executed, may further cause the processor 104 to perform the following: overwriting the text file with a dump of current entries in the hash set in a periodic manner for fault tolerance; and creating a new file with updated entries in the hash set, wherein the new file includes a subset of all method names excluding the method names removed by the pointcut process.

According to exemplary embodiments, for every subsequent restart of the application, the instructions, when executed, may further cause the processor 104 to perform the following: (i) loading the method names from the new file onto the hash set and storing onto the memory; (ii) for each method that is being invoked during the subsequent runtime of the application, implementing the pointcut process around execution of the method; (iii) removing, in response to the pointcut process, the method name associated with the method this is being invoked during the subsequent runtime of the application from the hash set stored onto the memory; and (iv) dynamically updating the new file so that the new file does not include the method name that is being removed during the subsequent runtime of the application.

According to exemplary embodiments, after running processes (i)-(iv) for a predetermined period of time, the instructions, when executed, may further cause the processor 104 to perform the following: creating a final list of method names in the new file that includes only the methods that have not been invoked at the restart of the application during the predetermined period of time; and deleting the methods that have not been invoked at the restart of the application during the predetermined period of time.

According to exemplary embodiments as disclosed above in FIGS. 1-7, technical improvements effected by the instant disclosure may include a platform for implementing a language agnostic dynamic dead code analysis module that identifies unused code dynamically at runtime and that can be injected into any existing code requiring little to no changes to the codebase itself.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for dynamic code analysis by utilizing one or more processors and one or more memories, the method comprising:
   creating a list of all method names associated with an application before launching the application;
   storing the list of all method names onto a file in a predefined file format before launching the application;
   at runtime of the application, loading the method names from the file onto a hash set and storing the hash set onto a memory;
   for each method that is being invoked during the runtime of the application, implementing a pointcut process around execution of the method; and
   removing, in response to the pointcut process, the method name associated with the method that is being invoked during the runtime of the application from the hash set stored onto the memory.

2. The method according to claim 1, wherein the list of all method names include entire code base of the application.

3. The method according to claim 1, in implementing the pointcut process around execution of the method, the method further comprising:
   implementing aspect oriented programming (AOP) to create a dynamic code analysis tool.

4. The method according to claim 3, further comprising: implementing AOP load-time weaving process.

5. The method according to claim 1, wherein the file is a text file and the predefined file format includes any one of the following file formats: .txt, .doc, .lst.

6. The method according to claim 5, further comprising:
   overwriting the text file with a dump of current entries in the hash set in a periodic manner for fault tolerance; and
   creating a new file with updated entries in the hash set, wherein the new file includes a subset of all method names excluding the method names removed by the pointcut process.

7. The method according to claim 6, wherein for every subsequent restart of the application, the method further comprising:
   (i) loading the method names from the new file onto the hash set and storing onto the memory;
   (ii) for each method that is being invoked during the subsequent runtime of the application, implementing the pointcut process around execution of the method;
   (iii) removing, in response to the pointcut process, the method name associated with the method that is being invoked during the subsequent runtime of the application from the hash set stored onto the memory; and
   (iv) dynamically updating the new file so that the new file does not include the method name that is being removed during the subsequent runtime of the application.

8. The method according to claim 7, wherein after running processes (i)-(iv) for a predetermined period of time, the method further comprising:
   creating a final list of method names in the new file that includes only the methods that have not been invoked at the restart of the application during the predetermined period of time; and
   deleting the methods that have not been invoked at the restart of the application during the predetermined period of time.

9. A system for dynamic code analysis, the system comprising:
   a processor; and
   a memory operatively connected to the processor via a communication interface, the memory storing computer readable instructions, when executed, causes the processor to:
   create a list of all method names associated with an application before launching the application;
   store the list of all method names onto a file in a predefined file format before launching the application;
   at runtime of the application, loading the method names from the file onto a hash set and store the hash set onto the memory;
   for each method that is being invoked during the runtime of the application, implement a pointcut process around execution of the method; and
   remove, in response to the pointcut process, the method name associated with the method that is being invoked during the runtime of the application from the hash set stored onto the memory.

10. The system according to claim 9, wherein the list of all method names include entire code base of the application.

11. The system according to claim 9, in implementing the pointcut process around execution of the method, the processor is further configured to:
    implement aspect oriented programming (AOP) to create a dynamic code analysis tool.

12. The system according to claim 11, wherein the processor is further configured to:
    implement AOP load-time weaving process.

13. The system according to claim 9, wherein the file is a text file and the predefined file format includes any one of the following file formats: .txt, .doc, .lst.

14. The system according to claim 13, wherein the processor is further configured to:
    overwrite the text file with a dump of current entries in the hash set in a periodic manner for fault tolerance; and
    create a new file with updated entries in the hash set, wherein the new file includes a subset of all method names excluding the method names removed by the pointcut process.

15. The system according to claim 14, wherein for every subsequent restart of the application, the processor is further configured to:
    (i) load the method names from the new file onto the hash set and storing onto the memory;
    (ii) for each method that is being invoked during the subsequent runtime of the application, implement the pointcut process around execution of the method;
    (iii) remove, in response to the pointcut process, the method name associated with the method that is being invoked during the subsequent runtime of the application from the hash set stored onto the memory; and (iv) dynamically update the new file so that the new file does not include the method name that is being removed during the subsequent runtime of the application.

16. The system according to claim 15, wherein after running processes (i)-(iv) for a predetermined period of time, the processor is further configured to:

create a final list of method names in the new file that includes only the methods that have not been invoked at the restart of the application during the predetermined period of time; and delete the methods that have not been invoked at the restart of the application during the predetermined period of time.

17. A non-transitory computer readable medium configured to store instructions for dynamic code analysis, wherein, when executed, the instructions cause a processor to perform the following:

creating a list of all method names associated with an application before launching the application;

storing the list of all method names onto a file in a predefined file format before launching the application;

at runtime of the application, loading the method names from the file onto a hash set and storing the hash set onto a memory;

for each method that is being invoked during the runtime of the application, implementing a pointcut process around execution of the method; and removing, in response to the pointcut process, the method name associated with the method that is being invoked during the runtime of the application from the hash set stored onto the memory.

18. The non-transitory computer readable medium according to claim 17, wherein the file is a text file and the predefined file format includes any one of the following file formats: .txt, .doc, .lst, and wherein the instructions, when executed, cause the processor to:

overwrite the text file with a dump of current entries in the hash set in a periodic manner for fault tolerance; and create a new file with updated entries in the hash set, wherein the new file includes a subset of all method names excluding the method names removed by the pointcut process.

19. The non-transitory computer readable medium according to claim 18, wherein for every subsequent restart of the application, the instructions, when executed, cause the processor to:

(i) load the method names from the new file onto the hash set and storing onto the memory;

(ii) for each method that is being invoked during the subsequent runtime of the application, implement the pointcut process around execution of the method;

(iii) remove, in response to the pointcut process, the method name associated with the method that is being invoked during the subsequent runtime of the application from the hash set stored onto the memory; and (iv) dynamically update the new file so that the new file does not include the method name that is being removed during the subsequent runtime of the application.

20. The non-transitory computer readable medium according to claim 19, wherein after running processes (i)-(iv) for a predetermined period of time, the instructions, when executed, cause the processor to:

create a final list of method names in the new file that includes only the methods that have not been invoked at the restart of the application during the predetermined period of time; and delete the methods that have not been invoked at the restart of the application during the predetermined period of time.

* * * * *